(12) United States Patent
Shimizu (10) Patent No.: US 11,977,441 B2
(45) Date of Patent: May 7, 2024

(54) FAULT TREE GENERATION DEVICE AND FAULT TREE GENERATION METHOD

(71) Applicant: Hitachi, Ltd., Tokyo (JP)

(72) Inventor: Yuuki Shimizu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/764,737

(22) PCT Filed: Aug. 31, 2020

(86) PCT No.: PCT/JP2020/032830
§ 371 (c)(1),
(2) Date: Mar. 29, 2022

(87) PCT Pub. No.: WO2021/070512
PCT Pub. Date: Apr. 15, 2021

(65) Prior Publication Data
US 2022/0374299 A1    Nov. 24, 2022

(30) Foreign Application Priority Data
Oct. 7, 2019 (JP) ................. 2019-184702

(51) Int. Cl.
*G06F 11/07* (2006.01)
(52) U.S. Cl.
CPC ........ *G06F 11/079* (2013.01); *G06F 11/0721* (2013.01)
(58) Field of Classification Search
CPC ............ G06F 11/079; G06F 11/0721; G05B 23/0248
See application file for complete search history.

(56) References Cited

U.S. PATENT DOCUMENTS 11,209,811 B2 * 12/2021 Shida ................. G05B 23/0275
2009/0113247 A1    4/2009 Gofuku et al.

FOREIGN PATENT DOCUMENTS

| JP | 6-123642 A | 5/1994 |
| JP | 2007-25981 A | 2/2007 |
| JP | 2017-111657 A | 6/2017 |

OTHER PUBLICATIONS

International Search Report (PCT/ISA/210) issued in PCT Application No. PCT/JP2020/032830 dated Nov. 10, 2020 with English translation (four (4) pages).

(Continued)

*Primary Examiner* — Nadeem Iqbal
(74) *Attorney, Agent, or Firm* — Crowell & Moring LLP (57) ABSTRACT

This failure tree generation device includes: a causal relationship storage unit that stores information indicating a linkage of the causal relationship of defects of respective component parts constituting subjects to be analyzed in a manner such that the information is associated with the connection relationship of the respective component parts; a system-level failure tree generation unit that generates, for each of the component parts and on the basis of component part constitution information indicating the constitution of component parts to be analyzed and component part connection information indicating the connection relationship of the respective component parts, first element information which is information indicating disturbance having occurred in information transfer between the respective component parts and which indicates the relationship between each of the component parts and a phenomenon having occurred on the component part, and generates, on the basis of the respective items of first element information, system level failure tree information indicating the causal relationship of defects of the component parts; and an equipment/component part level failure tree generation unit that searches for (Continued)

the causal relationship storage unit on the basis of the component part constitution information and the component part connection information, that generates two or more items of second element information indicating information relating to a plurality of events connecting to any one first element and indicating the relationship between the respective component parts and phenomena having occurred on the respective component parts, and that generates, on the basis of the respective items of the second element information, equipment/component part level failure tree information indicating the causal relationship of defects of the component parts, by way of a hierarchical structure.

10 Claims, 7 Drawing Sheets

(56) References Cited

OTHER PUBLICATIONS

Japanese-language Written Opinion (PCT/ISA/237) issued in PCT Application No. PCT/JP2020/032830 dated Nov. 10, 2020 (four (4) pages).

* cited by examiner

| | COMPONENT |
|---|---|
| 1 | COMPONENT A |
| 2 | COMPONENT B |
| 3 | COMPONENT C |
| 4 | COMPONENT D |
| 5 | COMPONENT E |
| 6 | COMPONENT F |
| 7 | COMPONENT G |
| 8 | COMPONENT H |
| 9 | COMPONENT I |
| 10 | COMPONENT J |

FAULT TREE GENERATION DEVICE AND FAULT TREE GENERATION METHOD

TECHNICAL FIELD

The present invention relates to a fault tree generation device and a fault tree generation method for generating a system level fault tree and/or a device and component (hereinafter referred to as device/component) level fault tree.

BACKGROUND ART

FTA (Fault Tree Analysis) has been known as an approach for preventing the product failure. The FTA is an analysis technique for genealogically searching for the cause of the product failure by sequentially sorting out the failure factor of the product failure phenomenon across the layers. The analysis result is formed into a tree structure having the product failure phenomenon positioned on a top, and the failure factor positioned on the lower layer. The analysis result with the tree structure will be called the fault tree. The failure phenomenon in the product as an analysis target will be called a top phenomenon as it is positioned on the top of the fault tree. The fault tree includes multiple layers. The failure factor of the terminal end of the failure tree will be called a terminal phenomenon as it is positioned at the terminal end of the fault tree. The terminal phenomenon represents the fundamental cause of the top phenomenon.

The FTA can be used for securing the product reliability in the design phase, and investigating the cause of the product failure. When it is used in the design phase, the failure phenomenon that should be avoided in the product is set as the top phenomenon. The countermeasure is then taken to prevent the terminal phenomenon as the fundamental cause derived from the analysis result so that reliability is improved. In the failure factor analysis after occurrence of the failure, the failure phenomenon which has occurred is set as the top phenomenon, and the FTA is performed. It is then confirmed whether the terminal phenomenon is actually the failure factor of the top phenomenon.

If the failure factor is found out immediately, the FTA can be performed in a short time. Meanwhile, if the failure factor cannot be found out immediately, it requires time to search for literature, get information from other people, or the like.

Whether the failure factor can be found out depends on the range of knowledge and experience of the designer who performs the FTA. In the case where multiple designers take charge of the design work dividedly, each knowledge of the respective designers is restrictive, or designers with little experience are required to take charge of the FTA owing to shortage of skilled designers, the failure factor cannot be found out immediately, resulting in elongated time for performing the FTA. Furthermore, in the case of introduction of a new component which has not been handled before, the new knowledge about the introduced component is required. This may interrupt immediate finding of the failure factor, and require much time for performing the FTA.

In the above-described circumstances, the mechanism for supporting the designer to find out the failure factor has been demanded for the effective performance of FTA.

The device described in Patent Literature 1 allows automatic generation of the fault tree, by which the failure factor can be found out. The device automatically generates the fault tree based on MFM (Multilevel Flow Modeling) information which systematically and organically expresses the goal, function, relationship between the functions, relationship between the function and the goal, and the relationship between the function and the component for implementing the function, the additional MFM information including the component behavior information which expresses the relationship between the failure and the component behavior upon the component failure, and the influence propagation rule which defines the influence that propagates upon change in the function.

The device described in Patent Literature 2 stores the causal relationship of the past failure in the database, and combines the causal relationships to automatically generate the fault tree.

CITATION LIST

Patent Literature

Patent Literature 1: Japanese Unexamined Patent Application Publication No. 2007-25981
Patent Literature 2: Japanese Unexamined Patent Application Publication No. 2017-111657

SUMMARY OF INVENTION

Technical Problem

The device disclosed in Patent Literature 1 uses the MFM information as original data upon generation of FTA. According to the Patent Literature 1, the chart expressed by the MFM is generally made by a knowledge engineer. It is difficult to determine whether or not the system has been accurately modeled by the MFM performed by the knowledge engineer. The technique for confirming correctness of the MFM model has been demanded. Generally, as system designers are not familiar with the MFM, it is difficult for them to understand such modeling (see paragraph [0013]). The device described in Patent Literature 1 can automatically generate the fault tree. However, it is necessary to produce the MFM information about the product as an analysis target. This may demand findings that involve the knowledge engineering technique for producing the MFM information in addition to the extensive knowledge about the product.

In order to utilize the device as disclosed in Patent Literature 1, the designer is required to produce the MFM information requiring the extensive knowledge and findings that involve the knowledge engineering technique. It is difficult for the design department where the design work is assigned to multiple designers, and there are insufficient skilled designers to satisfy the requirements.

The device disclosed in Patent Literature 2 automatically generates the fault tree by combining the causal relationships of past failures. In the case of different configuration of components between the product having the failure occurred in the past and the product required to be analyzed, there are possibilities that the generated fault tree contains the failure factor unrelated to the product required to be analyzed, and that omission occurs in the failure factor.

Assuming that "component B: phenomenon B" has caused "product A: phenomenon A" as the failure causal relationship of the past failure, the "component B: phenomenon B" represents that the phenomenon B has occurred in the component B. Accordingly, in the foregoing case, the phenomenon B occurred in the component B has caused the phenomenon A in the product A. The phenomena A, B indicate such failures as crack and breakage. The component B constitutes the product A.

There may be the cases that "component C: phenomenon C", "component D: phenomenon D", and "component E: phenomenon E" have caused the "product A: phenomenon A". The components C, D, and E constitute the product A.

The device disclosed in Patent Literature 2 is configured to generate the fault tree by collecting the above-described causal relationships for analyzing the failure factor of "product A: phenomenon A" using the FTA. The "component B: phenomenon B", "component C: phenomenon C", "component D: phenomenon D", and "component E: phenomenon E", each as the failure factor are displayed in the layer below the top phenomenon of the "product A: phenomenon A".

There may be the case that the configuration of components differs between the products each with the same name as a result of customization to satisfy the new needs or customer's needs. If the product A having the failure occurred in the past is constituted by the components "B", "C", "D", "E", and the product A required to be analyzed is constituted by the components "B", "C", "F", "G", the "component D: phenomenon D" and the "component E: phenomenon E" are the failure factors unrelated to the product A required to be analyzed. Each phenomenon which occurs in the components "F" and "G" may be the cause of the failure in the "product A". The possible cause as described above, however, cannot be obtained by the device disclosed in the Patent Literature 2.

The device disclosed in the Patent Literature 2 is configured to extract the "component B: phenomenon B", "component C: phenomenon C", "component D: phenomenon D", and "component E: phenomenon E" each as the failure factor of the top phenomenon "product A: phenomenon A" as described above. Subsequently, each failure factor of the "component B: phenomenon B", "component C: phenomenon C", "component D: phenomenon D", and "component E: phenomenon E" is extracted from the causal relationships of the past failure by executing the similar process. The above-described operations are repeatedly executed to dig through the causal factor so that the fault tree is generated. When digging through the failure factor, there may cause possible entry of the failure factor unrelated to the product required to be analyzed.

The product can be analyzed at the system level and the device/component level separately. The system level represents the whole system of the power plant to be built by combining multiple devices and components in accordance with the required performance and specification. The device/component level represents constituent elements of the power plant, for example, pumps, generators and the like. At the system level, devices/components as constituent elements and connection relationships of the power plant may differ depending on the required performance and specification in spite of the same power plant. Meanwhile, at the device/component level, the components as the constituent elements and the connection relationships hardly change compared with the system level. For example, the pump is generally constituted by the casing, the impeller, the main shaft, the bearing and the like. The basic configuration and the connection relationship of such component are not much different.

As described above, in the device disclosed in Patent Literature 2, if the configuration of components differs between the product having the past failure and the product required to be analyzed, there are possibilities that the failure factor unrelated to the product required to be analyzed is contained in the generated fault tree, and omission occurs in the failure factor.

At the system level where the device/component as constituent elements and the connection relationship differ depending on the individual plant, there are high possibilities that the failure factor unrelated to the product required to be analyzed is contained in the generated fault tree, and omission occurs in the failure factor.

For solving the above-described problem, it is an object of the present invention to generate the fault tree accurately from the system level to the device/component level.

Solution to Problem

In order to solve the problem, the present invention is provided with a causal relationship storage section configured to store information indicating failure of an analysis target, that is, the information indicating a chain of cause and effect of the failure in components belonging to multiple components at least constituting the analysis target in association with each component connection relationship, a system level fault tree generation section configured to generate information indicating turbulence which has occurred in information transmission between the components, that is, the information on a first element indicating a relationship between each component and a phenomenon occurred therein for each of the components based on component configuration information on the multiple components constituting the analysis target, and component connection information indicating each connection relationship among the multiple components, and generate information on a system level fault tree indicating each failure causal relationship between the components based on the generated information on the first element, and a device/component level fault tree generation section configured to search the causal relationship storage section based on the component configuration information and the component connection information, generate information relating to multiple phenomena linked to one of the first elements of the system level fault tree, and two or more pieces of information on a second element indicating a relationship between the component and a phenomenon occurred therein, and generate information on the device/component level fault tree for showing the failure causal relationship between the components in a layered structure based on the generated information on each of the second elements.

Advantageous Effects of Invention

The present invention allows accurate generation of the fault tree from the system level to the device/component level.

DESCRIPTION OF EMBODIMENTS

Embodiments for carrying out the present invention will be described in detail referring to the drawings. In the drawings, components A, B, and the like will be expressed as "C-A", "C-B", and phenomena A, B, and the like will be expressed as "P-A", "P-B" because of the limited space.

First Embodiment

Device Structure

Figure 1:
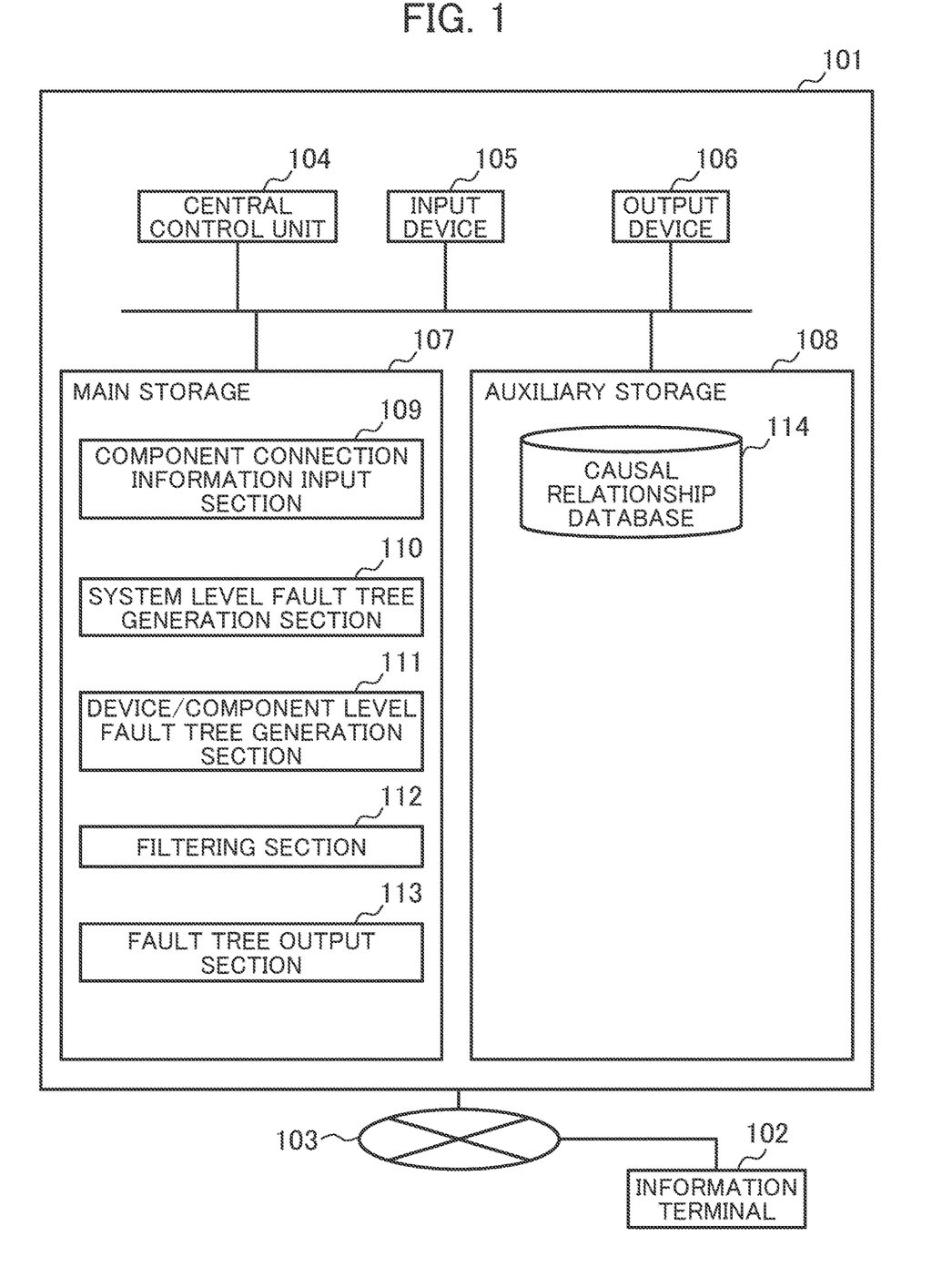
FIG. 1 illustrates a structure of a fault tree generation system according to a first example.

FIG. 1 illustrates a structure of a fault tree generation system according to a first embodiment. Referring to FIG. 1, the fault tree generation system configured to generate fault tree information from the system level to the component/device level includes a fault tree generation device 101 and an information terminal 102, which can be connected via a network 103. The fault tree generation device 101 is a generally employed computer, and includes a central control unit 104, an input device 105, an output device 106, a main storage 107, and an auxiliary storage 108. Those devices are interconnected with one another via a bus.

The central control unit 104 is constituted by a CPU (Central Processing Unit) for integrally controlling the overall device. The input device 105 is constituted by a keyboard or a mouse. The output device 106 is constituted by a display (display device) or a printer. In this case, the user is allowed to operate the input device 105 for inputting information related to the system (product) requiring solution.

The main storage 107 includes a component connection information input section 109, a system level fault tree generation section 110, a device/component level fault tree generation section 111, a filtering section 112, and a fault tree output section 113.

The auxiliary storage 108 stores a causal relationship database 114 (to be described in detail later). Hereinafter, the database will be referred to as the causal relationship DB (Data Base) 114 for short.

The auxiliary storage 108 serves as an external storage independent from the fault tree generation device 101. However, they can be connected to each other via the network 103.

Each of the component connection information input section 109, the system level fault tree generation section 110, the device/component level fault tree generation section 111, the filtering section 112, and the fault tree output section 113, which constitute the main storage 107 is formed as the program. It is assumed that any one of those sections, which serves as the subject for performing the specific operation will be interpreted as described below. That is, the central control unit 104 reads each program from the auxiliary storage 108, and loads the program to the main storage 107 so that the program function (to be described in detail later) is implemented. The component connection information input section 109 accepts the device/component connection information of the system as an analysis target, which has been input by a user via the input device 105. Based on the input device/component connection information, the system level fault tree generation section 110 generates a system level fault tree (to be described in detail later). Based on the causal relationship stored in the causal relationship DB 114, the device/component level fault tree generation section 111 generates a device/component level fault tree with respect to the failure factor of the device/component, which is contained in the system level fault tree generated by the system level fault tree generation section 110 (to be described in detail later). The filtering section 112 executes the process for filtering the failure factor having no component name contained in the device/component connection information input through the component connection information input section 109 from the device/component level fault tree generated by the device/component level fault tree generation section 111. The fault tree output section 113 outputs the information on the system level fault tree and the device/component level fault tree, which has been processed through the system level fault tree generation section 110, the device/component level fault tree generation section 111, and the filtering section 112 to the output device 106.

The information terminal 102 is also a generally employed computer, and constituted by a central control unit, an input device, an output device, a main storage, and an auxiliary storage (not shown). They are interconnected with one another via the bus. The information terminal 102 is capable of transmitting/receiving information to/from the fault tree generation device 101 via the network 103. In this case, the user is allowed to input the information relating to the system (product) requiring solution by operating the input device of the information terminal 102.

System Level Fault Tree Generation Process

The system level fault tree generation process is executed to generate the fault tree considering that the failure is caused by turbulence in flow of energy in the system, for example, current and amperage. The turbulence of energy flow means turbulence in transmission of information that contains current, in other words, deviation of the information transmission from the normal state.

Figure 2A:
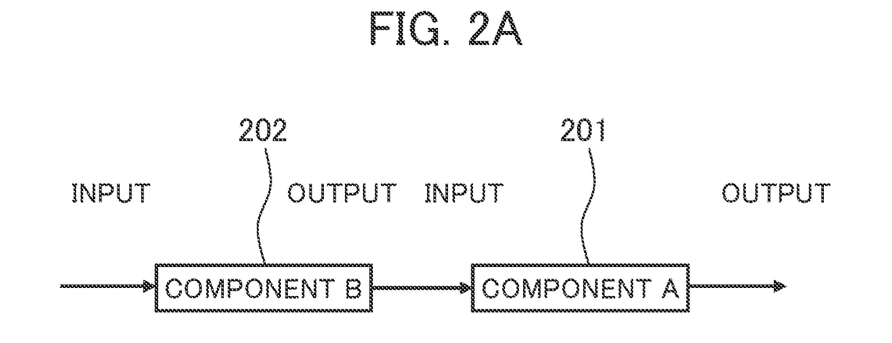
FIG. 2A illustrates an exemplary system structure.

The specific process for generating the system level fault tree will be described using a system including a component A 201 and a component B 202 as shown in FIG. 2A. In the system, the component B 202 receives an input of the information that contains current, and outputs the input information. The component A 201 receives an input of the output information, and further outputs the information. If the output from the component A 201 has the output failure, the output from the component A 201 is located at the most downstream (information reception side) of the system. The output failure of the component A becomes the top phenomenon of the system. The output failure of the component A 201 is considered to have been caused by "component A: simplex failure" and "component A: input failure" in terms of the component configuration. The "component A: input failure" is considered to have been caused by "component B: output failure" in terms of the connection relationship between the components A 201 and B 202. In terms of the component configuration of the component B 202, "component B: output failure" is considered to have been caused by "component B: simplex failure", and "component B: input failure". In the information transmission process between the components A 201 and B 202 for constituting the system, the fault tree is generated considering that turbulence in the information transmission, that is, deviation from the normal state is the cause of the failure.

Figure 2B:
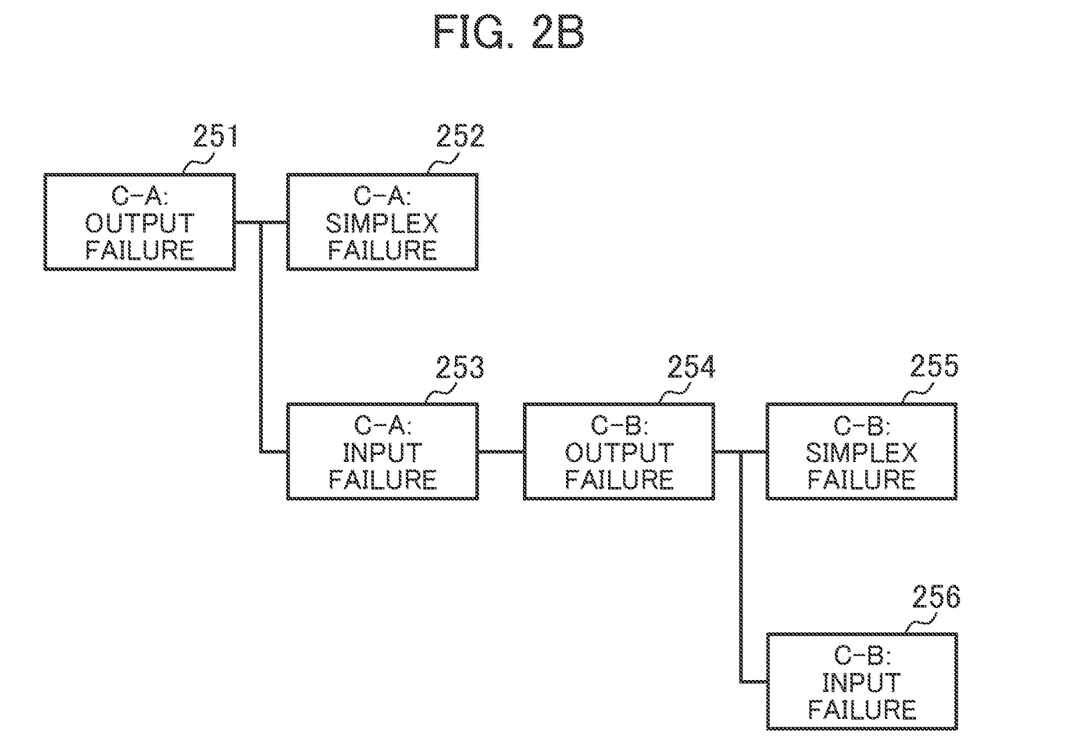
FIG. 2B is an explanatory view of an exemplary system level fault tree generation.

It is assumed that the "simplex failure", "output failure", and "input failure" exist as failure factors of the components A 201 and B 202, respectively, which are connected to each other, while having the input side of the component A 201 connected to the output side of the component B 202. The system level fault tree generation section 110 generates a failure factor 251 indicating the output failure of the component A, a failure factor 252 indicating the simplex failure of the component A, and a failure factor 253 indicating the input failure of the component A based on the configuration information (component configuration information) of the component A 201 so that the fault tree information having the respectively generated elements 251 to 253 connected to one another is generated. Based on the configuration information of the component B 202, the system level fault tree generation section generates an element 254 indicating the output failure of the component B, an element 255 indicating the simplex failure of the component B, and an element 256 indicating the input failure of the component B, which are failure factors relating to the component B 202 so that the fault tree information having the respectively generated elements 254 to 256 connected to one another is generated. Based on the connection information of the components A 201 and B 202 (connection information input to the component connection information input section 109), the system level fault tree generation section 110 generates the fault tree information having the elements 253 and 254 connected to each other. The fault tree generated through execution of the process becomes the system level fault tree as shown in FIG. 2B.

Execution of the process provides the system level fault tree without noise nor omission.

Input of Component Connection Information

As described above, the system level fault tree generation process is executed to generate the fault tree considering the information transmission direction in the system. In other words, the fault tree is generated while having the path of connecting the components traced from the one as recipient of the information that contains current to the one as transmitter of the information. The connection relationship between the constituent components of the system is required for generating the system level fault tree.

Figure 3A:
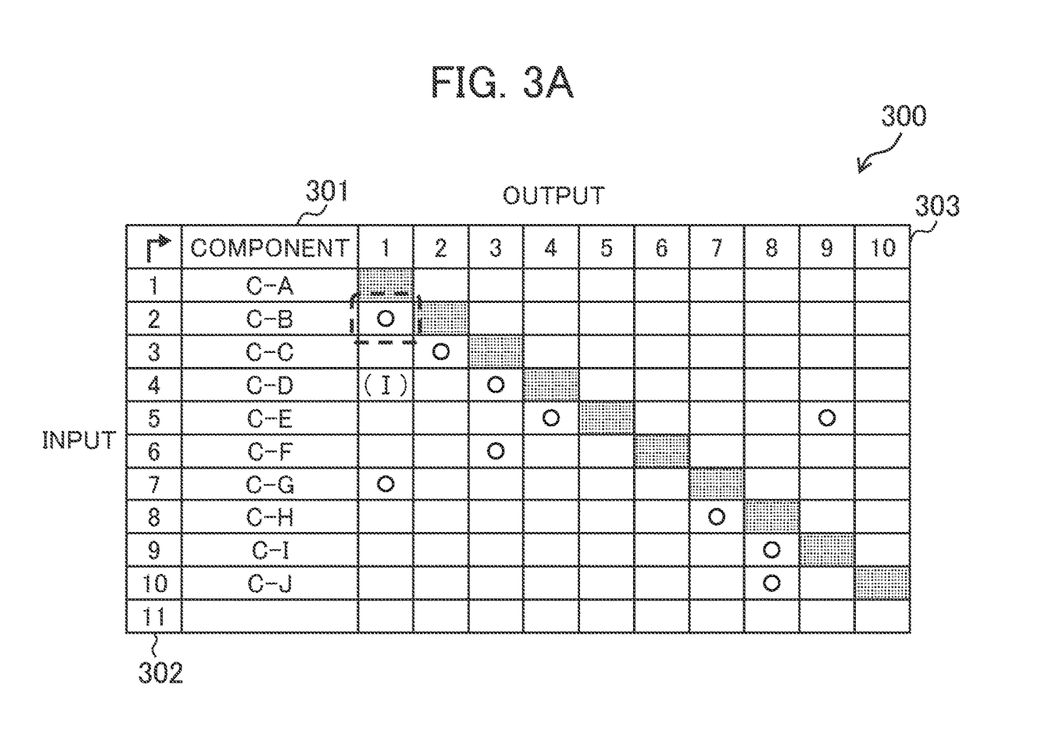
FIG. 3A represents an exemplary structure of a component connection information table.

Referring to FIG. 3A, based on the information input by the user, the component connection information input section 109 registers an inter-component connection relationship in a component connection information table 300. The component connection information table 300 includes a component 301, a vertical column 302 where the numbers are arrayed, and a horizontal row 303 where the numbers are arrayed. The component 301 indicates the configuration information of the component that constitutes the system (product) requiring solution, each field of which receives an input of each information on the name of multiple components, for example, the information on the "component A" to "component J". The number in the vertical column 302 indicates an ID number at the input side of each component. The number in the horizontal row 303 indicates the ID number at the output side of each component. The number is allocated to the respective fields of the horizontal row and the vertical column. The user inputs the component name only in each field of the component 301 corresponding to the number in the field of the vertical column 302. The same component exists in the field of the horizontal row, to which the same number as that of the field of the vertical column is allocated. Namely, the "component A" entered in the first field of the component 301 exists in the first field of the horizontal row. The "component B" entered in the second field of the component 301 exists in the second field of the horizontal row.

Figure 3B:
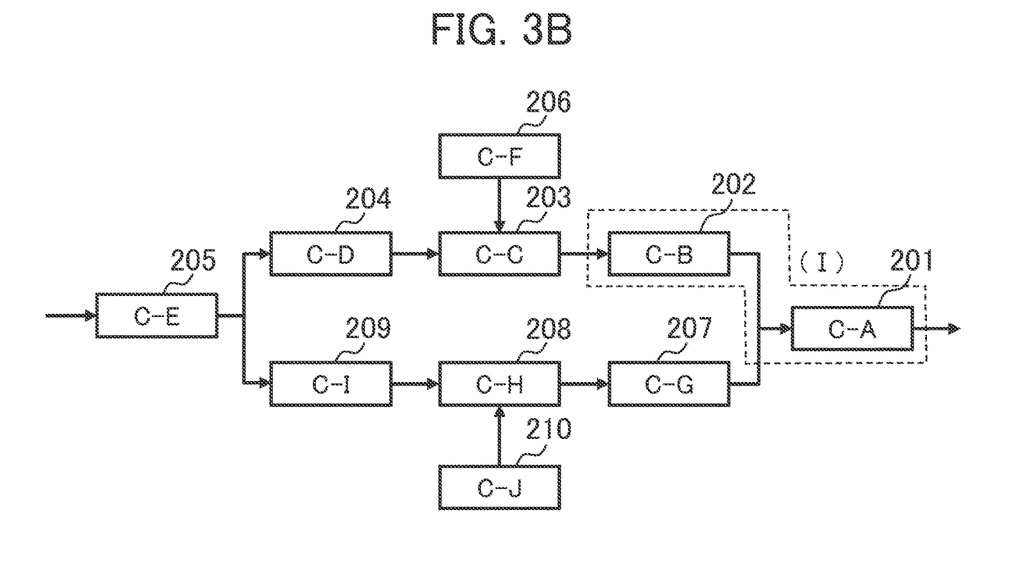
FIG. 3B illustrates an exemplary structure of constituent components of the system.

The information "o" input by the user in the field defined by the numbers of the vertical column and the horizontal row indicates the connection between the components corresponding to the numbers in the fields of the vertical column and the horizontal row. In this case, the component in the field of the vertical column represents the input side, and the component in the field of the horizontal row represents the output side. Referring to (I) of FIG. 3A, the information "o" is input in the field defined by the second vertical column and the first horizontal row. This indicates that components "B" and "A" are connected, and specifically, the "component B" is at the input side, and the "component A" is at the output side. Information input in the table as shown in FIG. 3A (contents registered in the component connection information table 300) represents connection relationships (inter-component connection relationship) among components A 201 to J 210. The component A 201 has its input side connected to the output side of the component E 205 via the components B 202, C 203, and D 204, and connected to the component E 205 via the components G 207, H 208, and I 209. Furthermore, the component C 203 has its input side connected to the output side of the component F 206, and the component H 208 has its input side connected to the output side of the component J 210. In the circumstances, the configuration information of component constituting the system (product) requiring solution, which indicates the information on names of multiple components, and the component connection information indicating the inter-component connection relationship are registered in the component connection information table 300. The section (I) as shown in FIG. 3A corresponds to the section (I) as shown in FIG. 3B.

Causal Relationship

The causal relationship DB 114 stores the causal relationship of the past failure. The causal relationship represents the chain of cause and effect leading to occurrence of failure. The causal relationship is generated using information extracted from the individual failure cases occurred in the past.

In this case, the causal relationship DB 114 configured as a causality related storage section for storing the information indicating the failure in the system (product) to be analyzed, that is, the chain of cause and effect of the failure causal relationship among multiple components constituting at least the analysis target in association with the component connection relationship.

Figure 4A:
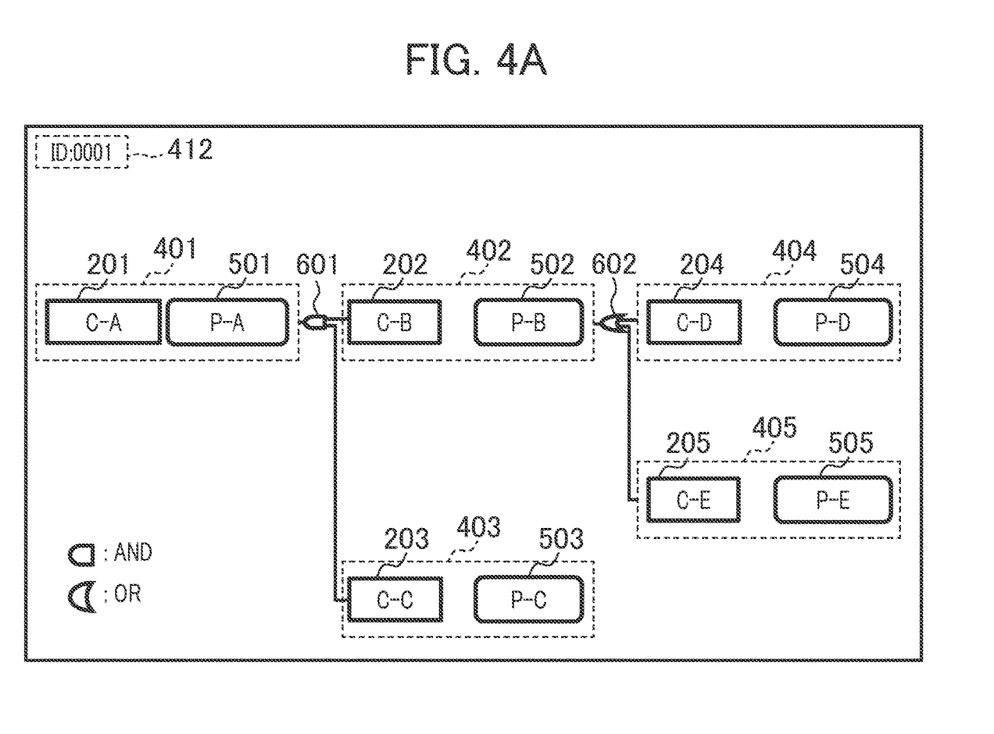
FIG. 4A illustrates an exemplary structure of a causal relationship of failure of the constituent components of the system.

FIG. 4A shows an example of the causal relationship. Elements 401 to 405 which constitute the causality include components A 201 to E 205, and phenomena A 501 to 505, respectively. The respective elements are linked sequentially in the cause-and-effect order. Referring to the example of FIG. 4A, the right-side element causes the element on the immediate left side. The elements are linked via an AND condition 601 and an OR condition 602. In the case of the AND condition 601, the left-side element 401 is caused upon occurrence of all the linked elements 402, 403. In the case of the OR condition 602, the left-side element 401 is caused upon occurrence of any one of the linked elements 404 and 405.

Referring to the example of FIG. 4A, the phenomenon B 502 occurs in the component B 202 as a result of the phenomenon D 504 which has occurred in the component D 204, or the phenomenon E 505 which has occurred in the component E 205. The phenomenon A 501 occurs in the component A 201 as a result of the phenomenon B 502 which has occurred in the component B 202, and the phenomenon C 503 which has occurred in the component C 203.

An ID 412 (ID:0001) is preliminarily assigned to each of the causal relationships stored in the causal relationship DB 114 for individual identification.

The causal relationship as shown in FIG. 4A has similarity to the FTA result in terms of the linkage of the elements 401 to 405 constituting the causality via the AND condition 601 or the OR condition 602. The causal relationship of the embodiment is characterized in that each element that constitutes the causality is expressed as a set of the component and the phenomenon which occurs therein.

Figure 4B:
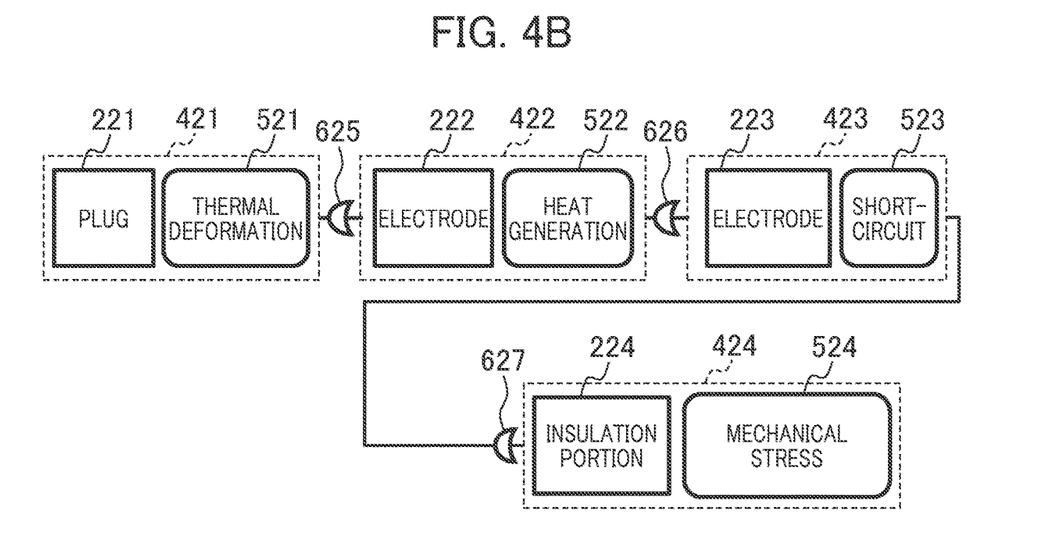
FIG. 4B illustrates an exemplary structure of a causal relationship relating to thermal deformation of a plug.

FIG. 4B shows an example of the causal relationship relevant to thermal deformation of a plug. Multiple elements 421 to 424 which constitute the causality are connected via OR conditions 625 to 627, respectively. In this example, a mechanical stress 524 occurs in an insulation portion 224 of the element 421 to cause a short-circuit 523 in an electrode 223 of the element 423. The short-circuit 523 which occurs in the electrode 223 causes heat generation 522 in the electrode 222 of the element 422. Finally, a thermal deformation 521 occurs in a plug 221 of the element 421.

Device/Component Level Fault Tree Generation

Figure 5:
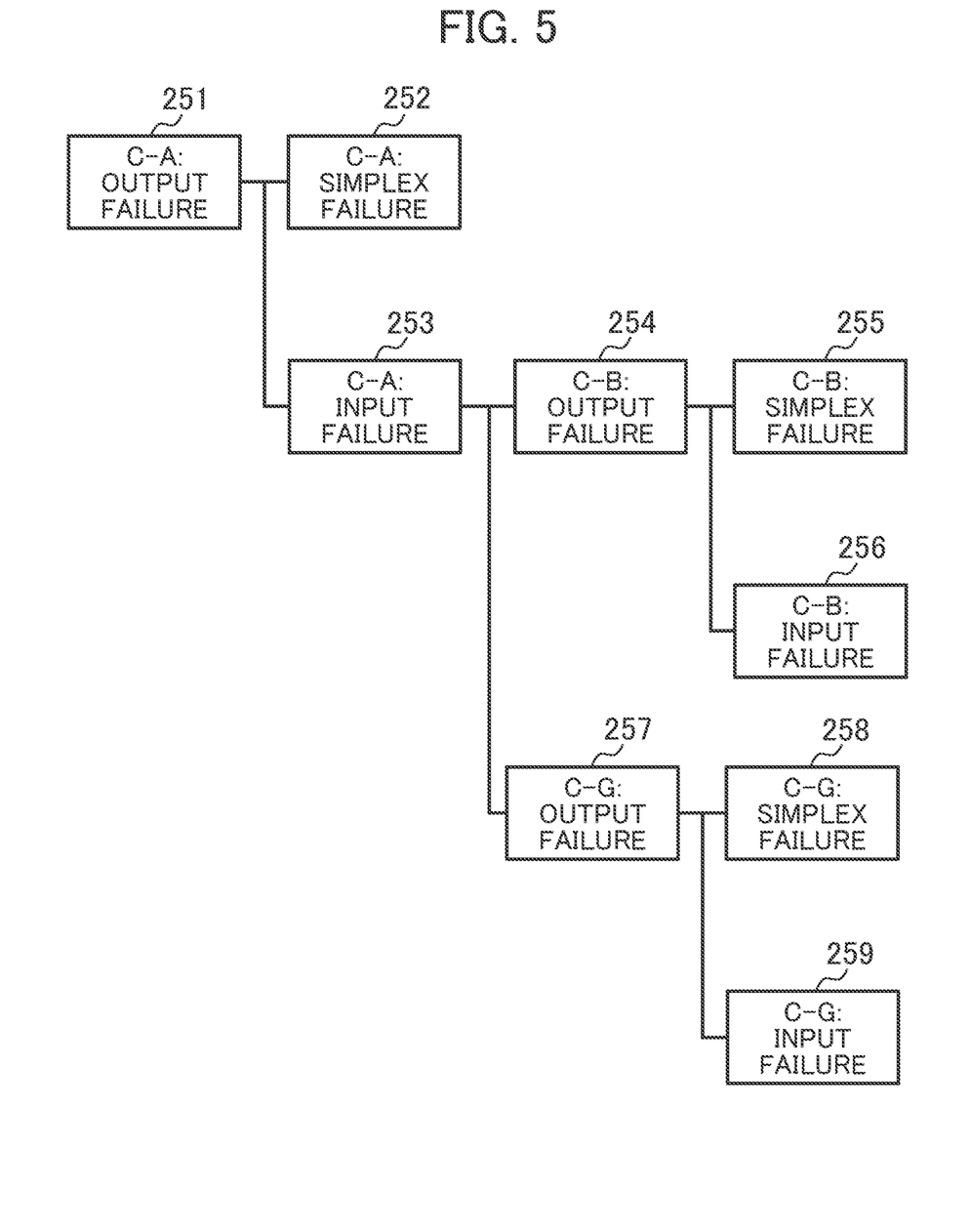
FIG. 5 represents an exemplary system level fault tree generation.

FIG. 5 shows a part of the system level fault tree generated by executing the system level fault tree generation process in accordance with the input content as shown in FIG. 3A.

It is assumed that the components A 201, B 202, and G 207 which constitute the system (product) are connected to one another, the component A 201 has its input side connected to each output side of the components B 202 and G 207, and failure factors of the components A 201, B 202, and G 207 are "simplex failure", "output failure", and "input failure", respectively. Under the condition where turbulence has occurred in the information transmission between the components, the system level fault tree generation section 110 generates the failure factor relating to the component A 201, that is, an element 251 indicating the output failure of the component A, an element 252 indicating the simplex failure of the component A, and an element 253 indicating the input failure of the component A. The information on the system level fault tree for connecting the generated elements 251 to 253 to one another is generated. Based on the component configuration information of the component B 202, the failure factor relating to the component B 202, that is, an element 254 indicating the output failure of the component B, an element 255 indicating the simplex failure of the component B, and an element 256 indicating the input failure of the component B are generated. The information on the system level fault tree for connecting the generated elements 254 to 256 to one another is generated.

Based on the component configuration information of the component G 207, the system level fault tree generation section 110 generates the failure factor relating to the component G 207, that is, an element 257 indicating the output failure of the component G, an element 258 indicating the simplex failure of the component G, and an element 259 indicating the input failure of the component G, and further generates the information on the system level fault tree for connecting the generated elements 257 to 259 to one another. Based on the connection information of the components A 201, B 202 and G 207 (component connection information input to the component connection information input section 109), the system level fault tree generation section 110 generates the information on the system level fault tree having the elements 253, 254, and 257 connected to one another.

Based on the component configuration information on multiple components constituting the system (product) as the analysis target, and the component connection information indicating the respective connection relationships among the multiple components, the system level fault tree generation section 110 generates the information indicating turbulence occurred in the information transmission between the respective components, that is, the information on the elements (first element) 251 to 259 each indicating the relationship between the component and the phenomenon occurred therein for each component. Based on the generated first element information, the system level fault tree information indicating the inter-component failure causal relationship is generated.

The generated system level fault tree contains the simplex failure of the constituent component as the failure factor, for example, "component A: simplex failure", and "component B: simplex failure". Based on the causal relationship stored in the above-described causal relationship DB 114, the device/component level fault tree generation section 111 generates the device/component level fault tree with respect to the simplex failure of the constituent component of the system.

Figure 6A:
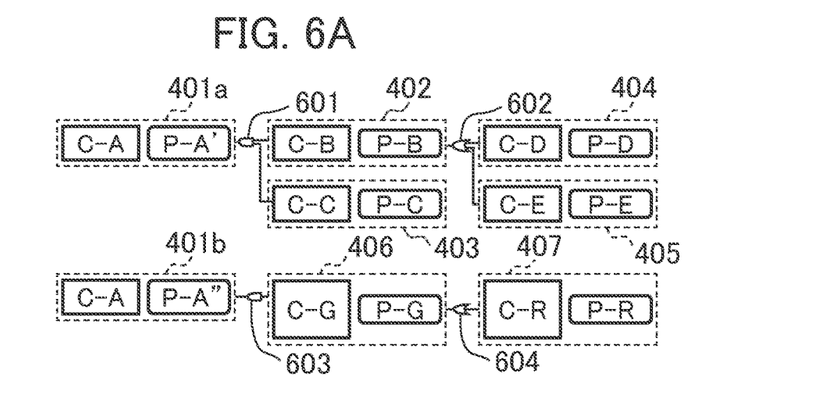
FIG. 6A is an explanatory view of a part of the process for generating a device/component level fault tree.
Figure 6B:
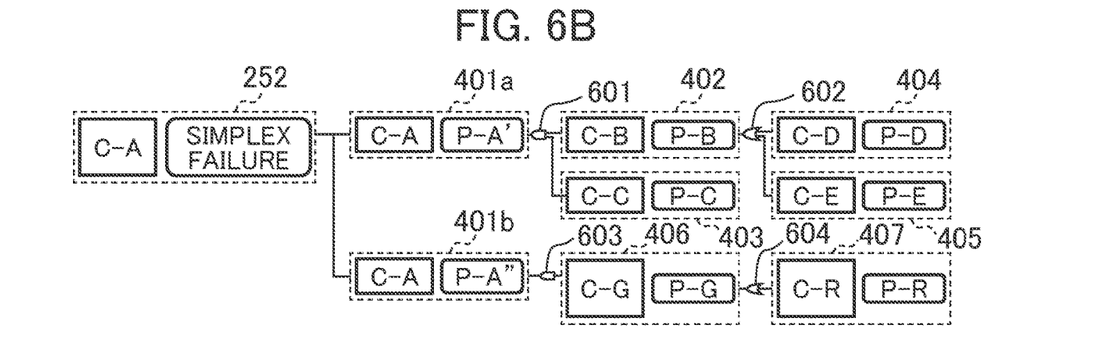
FIG. 6B is an explanatory view of a part of the process for generating the device/component level fault tree.
Figure 6C:
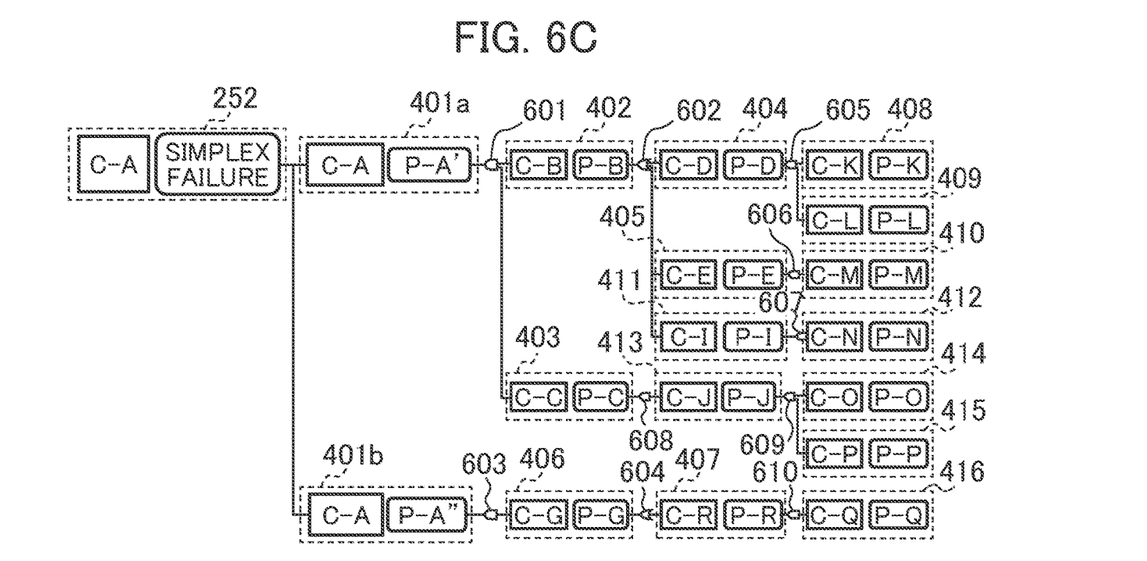
FIG. 6C is an explanatory view of a part of the process for generating the device/component level fault tree.

FIGS. 6A to 6C show the specific process flow. The following explanation will be made with respect to generation of the device/component level fault tree in the case of the "component A: simplex failure".

Firstly, in order to extract the failure factor relating to the "component A: simplex failure", the device/component level fault tree generation section 111 searches the causal relationship DB 114 (see FIG. 6A) for the causal relationship including the "component A". If causal relationships of two elements including an element 401a of "component A: phenomenon A'" and an element 401b of "component A: phenomenon A''" are hit, the device/component level fault tree generation section 111 generates the device/component level fault tree information for each of the elements.

It is assumed that the causal relationship DB 114 registers the causal factor of the past failure, that is, the element 401a of "component A: phenomenon A'", which has been caused by the element 402 of "component B: phenomenon B" and the element 403 of "component C: phenomenon C" via the AND condition 601, and the element 402 of "component B: phenomenon B", which has been caused by the element 404 of "component D: phenomenon D" or the element 405 of "component E: phenomenon E" via the OR condition 602. In this case, based on the component connection information of the component A 201 and the "phenomenon A'", the device/component level fault tree generation section 111 extracts the information on the element 402 of "component B: phenomenon B", the element 403 of "component C: phenomenon C", the element 404 of "component D: phenomenon D", and the element 405 of "component E: phenomenon E" from the causal relationship DB 114, and further extracts the information on the AND condition 601, the OR condition 602 from the causal relationship DB 114 to generate the information on connection of the elements 402, 403 to the element 401a via the AND condition 601, and connection of the elements 404, 405 to the element 402 via the OR condition 602.

It is assumed that the causal relationship DB 114 registers the causal relationship of the past failure, that is, an element 401b of "component A: phenomenon A''", which has been caused by the element 406 of the "component G: phenomenon G" via the AND condition 603, and the element 406 of "component G: phenomenon G", which has been caused by an element 407 of "component R: phenomenon R" via the OR condition 604. In this case, based on the component connection information of the component A 201 and the "phenomenon A'''", the device/component level fault tree generation section 111 extracts the information on the element 406 of "component G: phenomenon G" and the element 407 of "component R: phenomenon R" from the causal relationship DB 114, and further extracts the information on the AND condition 603 and the OR condition 604 from the causal relationship DB 114 to generate the information on connection of the element 406 to the element 401b via the AND condition 603, and connection of the element 407 to the element 406 via the OR condition 604.

The device/component level fault tree generation section 111 combines causal relationships of the two hit elements into one fault tree (see FIG. 6B). In other words, the device/component level fault tree generation section 111 connects the elements 401a, 401b to the element 252 of "component A: simplex failure" as the failure factor of the top phenomenon, and generates the fault tree information relating to the simplex failure of the component A 201 as the information on the device/component level fault tree. In the generated fault tree, the failure factors except the hit failure factors (the element 401a of "component A: phenomenon A'" and the element 401b of "component A: phenomenon A''''"), for example, the failure factors of the elements 402 to 407 will be referred to as intermediate phenomena. The terminal element linked to the intermediate phenomenon will be referred to as a terminal phenomenon. In this case, the device/component level fault tree generation section 111 searches the causal relationship DB 114 for the causal relationship including the intermediate phenomenon, and combines the thus searched intermediate phenomenon, and the hit causal relationship with the original fault tree to repeatedly perform searching and combination of the intermediate phenomena. Accordingly, the device/component level fault tree generation section generates the information on the device/component level fault tree constituted by multiple elements from the intermediate phenomenon to the terminal phenomenon linked to the element 252 as the top phenomenon.

If the causal relationship DB 114 registers the causal relationship of the past, that is, the element 404 of "component D: phenomenon D" caused by an element 408 of "component K: phenomenon K", and an element 409 of "component L: phenomenon L" via the AND condition 605, the elements 408, 409 are extracted as the intermediate phenomena. If the causal relationship DB 114 registers the element 405 of "component E: phenomenon E" caused by an element 410 of "component M: phenomenon M" via the AND condition 606, the element 410 is extracted as the intermediate phenomenon. If the causal relationship DB 114 registers the element 402 of "component B: phenomenon B" caused by the element 404 of "component D: phenomenon D", the element 405 of "component E: phenomenon E", or an element 411 of "component I: phenomenon I" via the OR condition 602, and the element 411 of "component I: phenomenon I" caused by the element 412 of "component N: phenomenon N" via the AND condition 607, the elements 411, 412 are extracted as the intermediate phenomena.

If the causal relationship DB 114 registers the element 403 of "component C: phenomenon C" caused by an element 413 of "component J: phenomenon J" via an AND condition 608, and the element 413 of "component J: phenomenon J" caused by an element 414 of "component O: phenomenon O" and an element 415 of "component P: phenomenon P" via an AND condition 609, the elements 413, 414, 415 are extracted as the intermediate phenomena. If the causal relationship DB 114 registers the element 407 of "component R: phenomenon R" caused by an element 416 of "component Q: phenomenon Q" via an AND condition 610, the element 416 is extracted as the intermediate phenomenon. During execution of the process, there may be the case that the element of the intermediate phenomenon is extracted as the element of the terminal phenomenon.

Based on the component configuration information and the component connection information, the device/component level fault tree generation section 111 searches the causal relationship DB 114, and generates the information on any one of the first elements in the system level fault tree, for example, multiple phenomena (intermediate phenomenon, terminal phenomenon) linked to the element 252, that is, two or more pieces of information on the second elements (elements 401a, 401b, 402 to 416) indicating each relationship between the component and phenomenon occurred therein. Based on the generated information on the second elements, the device/component level fault tree generation section generates the information on the device/component level fault tree (information on the fault tree as shown in FIG. 6C) for expressing the inter-component failure causal relationship in the layered structure.

Filtering Section

The device/component level fault tree includes the failure factor other than that of the component constituting the system as the analysis target, for example, the elements 408 of "component K: phenomenon K", 409 of "component L: phenomenon L", and 410 of "component M: phenomenon M" as shown in FIGS. 6A to 6C. This may be caused owing to the following reasons. One of the reasons is the difference in the component configuration between the product having the failure occurred in the past and the product required to be analyzed even if each of those components has the same name. The other reason is that the causal relationship unrelated to the system as the analysis target may be searched and combined upon repetitive search and combination of the intermediate phenomena in the process executed by the device/component level failure tree generation section 111.

Figure 7A:
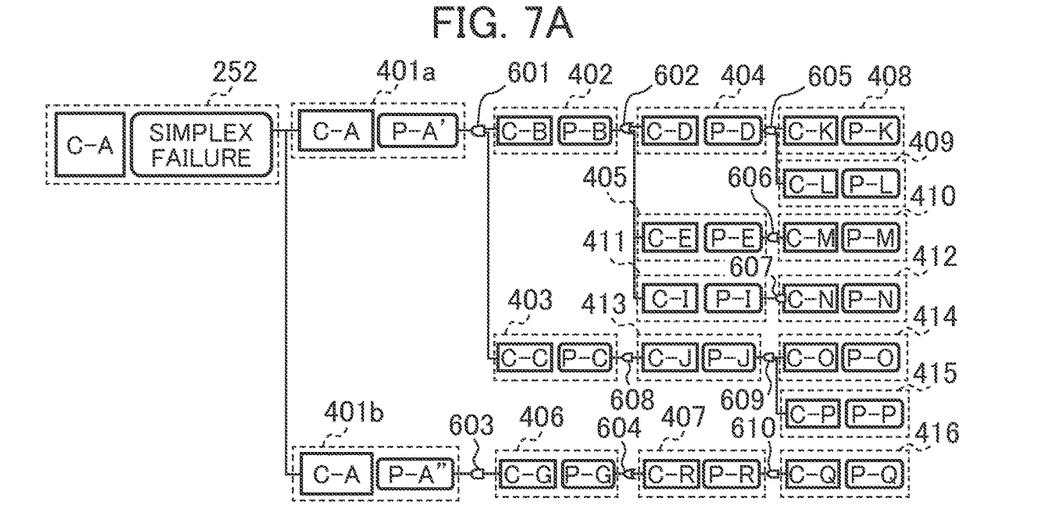
FIG. 7A represents an exemplary device/component level fault tree generation before execution of filtering process.
Figure 7B:
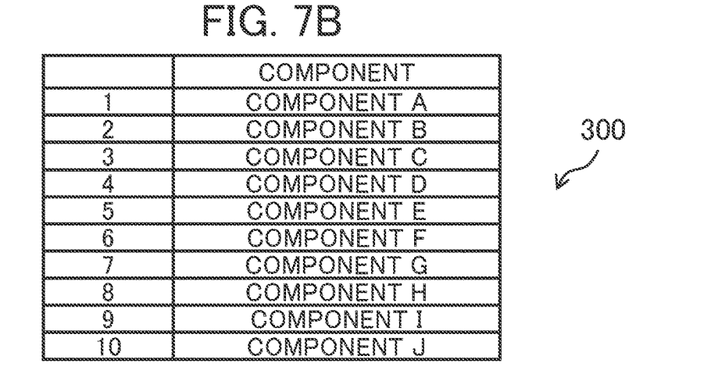
FIG. 7B represents an exemplary structure of a component connection information table.
Figure 7C:
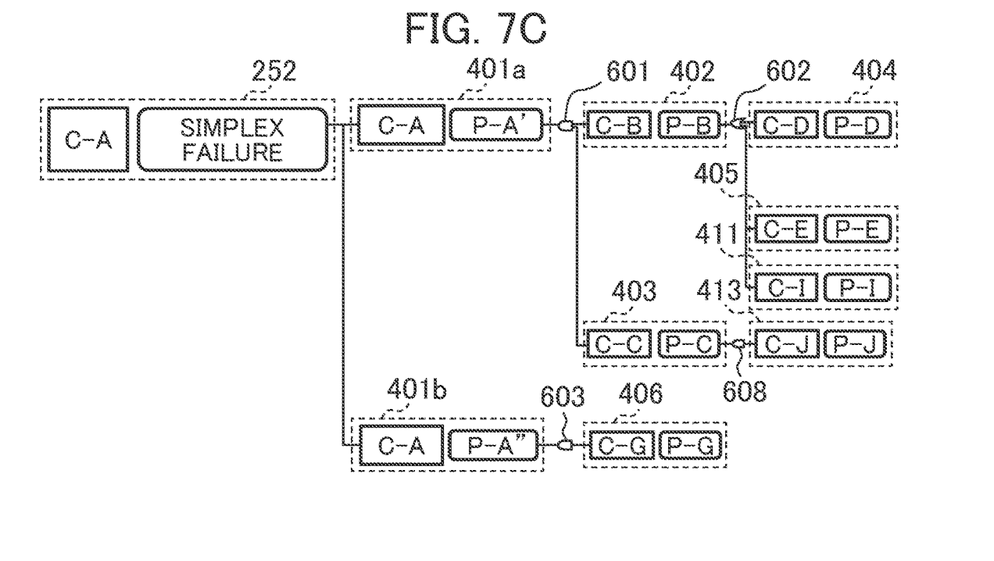
FIG. 7C represents an exemplary device/component level fault tree generation after execution of the filtering process.

As FIGS. 7A to 7C show, the filtering section 112 executes the filtering process as described below. That is, the filtering section acquires the component name (registered in the component connection information table 300) input through the component connection information input section 109 therefrom, and executes matching between the acquired component name and the one contained in the element belonging to the individual failure factor of the device/component level failure tree generated by the device/component level fault tree generation section 111. The failure factor element having the component name that does not match the one input through the component connection information input section 109 is then removed from the failure factor elements.

Specifically, as FIG. 7A shows, the filtering section 112 acquires information relating to the device/component level fault tree generated by the device/component level fault tree generation section 111, that is, the information containing logical conditions such as the elements 402 to 416, and the AND condition 601 from the device/component level failure tree generation section 111. As FIG. 7B shows, the filtering section acquires the information relating to the component name input through the component connection information input section 109, that is, the component configuration information relating to the component names (registered in the component connection information table 300) of multiple components constituting the system (product) requiring solution from the component connection information input section 109. The acquired information data are compared to remove the elements 407, 408, 409, 410, 412, 414, 415, 416 having components (K, L, M, N, O, P, Q, R) with names unmatching those (components A to J) registered in the component connection information table 300 from the elements 402 to 416 as shown in FIG. 7C. This makes it possible to accurately generate the fault tree information relating to the components constituting the system required to be analyzed.

The result of process executed by the filtering section 112 (information after the filtering process) is transferred to the fault tree output section 113, and the fault tree output section 113 transfers the result of process executed by the filtering section 112 to the output device 106. The fault tree information as shown in FIG. 7C is displayed on the screen of the output device 106. The filtering section 112 transfers the information (information before the filtering process executed by the filtering section 112) generated by the device/component level fault tree generation section 111, and the information after the filtering process to the output device 106 via the fault tree output section 113. This makes it possible to display the fault tree information as shown in FIG. 7A on the screen of the output device 106. In this case, the output device 106 is allowed to display the information on the elements 407, 408, 409, 410, 412, 414, 415, 416 in the display mode different from the one for displaying the information on the elements 252, 401a, 401b, 402, 403, 404, 405, 406, 411, 413. For example, when displaying the information on the elements 252, 401a, 401b, 402, 403, and the like in a black and white (monochrome) mode, the information on the elements 407, 408, 409, 410, 412, 414, 415, 416 may be displayed in a gray mode so as to indicate that the elements displayed in the gray mode are unrelated to the system required to be analyzed. The information on the elements 407, 408, 409, 410, 412, 414, 415, 416 may be displayed in the blinking mode instead of the gray mode.

Image of Usage by User

When the user operates the input device 105 or the information terminal 102 for inputting the information relating to the system (product) requiring solution, a component connection information input screen as shown in FIG. 3A is displayed on the output device 106 or an output device (not shown) of the information terminal 102 for presenting the information of the component connection information table 300. The user is allowed to input the name of the component constituting the system required to be analyzed, and the inter-component connection relationship in the manner as described above while viewing the displayed component connection information input screen. When the user inputs the information relating to the system (product) requiring solution, the component connection information input section 109 registers the input information in the component connection information table 300. The system level fault tree generation section 110 then executes the system level fault tree generation process so that the system level fault tree information as shown in FIG. 5 is displayed on the output device 106 or the output device of the information terminal 102. When the user selects the simplex failure as the constituent component failure on the system level fault tree, for example, "component A: simplex failure", the device/component level fault tree generation section 111 executes the device/component level fault tree generation process.

Subsequently, the filtering section 112 executes the constituent component filtering process so that the device/component level fault tree information (information shown in FIG. 7C) is displayed on the output device 106 or the output device of the information terminal 102.

The embodiment allows accurate generation and display of the fault tree including multiple elements indicating the failure factors from the system level to the device/component level without using the MFM information. That is, the fault tree can be displayed without causing noise nor omission. Consequently, the product reliability can be improved in the phase of design for generating the fault tree, and the factor of the failure which occurs in the product can be efficiently investigated.

Second Embodiment

In the first embodiment, the component connection information can be input in the format as shown in FIG. 3A. In this embodiment, the inter-component connection relationship as shown in FIG. 3B is extracted as the constituent component and the connection relationship from data such as the 2D drawing and the 3D model for defining the inter-component connection relationship.

If the product as the analysis target is constituted by the components A 201 to J 210, the information on the 2D drawing or the 3D model which stores each component configuration information (indicating each circuit structure of components) of the components A 201 to J 210, and the component connection information indicating the inter-component connection relationship in association with the product is preliminarily stored in the causal relationship DB 114 or the other DB (not shown) as the component information storage section. When the user inputs the information that specifies the product, the component connection information input section 109 searches the causal relationship DB 114 or the other DB in response to the user's operation based on the input information (information for specifying the product) to take each component configuration information of the components A 201 to J 210 (information indicating each name of the components), and the component connection information indicating the inter-component connection relationship from the causal relationship DB 114 or the other DB. The taken information is transferred to the system level fault tree generation section 110, the device/component level failure tree generation section 111, and the filtering section 112.

Based on the transferred information, the system level fault tree generation section 110 searches the causal relationship DB 114 to generate the information relating to the system level fault tree. Based on the transferred information, the device/component level fault tree generation section 111 searches the causal relationship DB 114 to generate the information relating to the fault tree from the system level to the device/component level. Based on the transferred information, the filtering section 112 searches the causal relationship DB 114 to acquire the name of the component constituting the product, and executes matching between the acquired name and the name of the component belonging to the respective elements of the device/component level fault tree generated by the device/component level fault tree generation section 111. The filtering process is executed to remove the element having the component name which does not match the one registered in the causal relationship DB 114 from the elements. The filtering result is transferred to the fault tree output section 113.

This embodiment provides the similar effect to the one derived from the first embodiment, and allows the user to save labor for inputting the component connection information.

A modified example will be described. In the modified example, the fault tree generation device 101 is used as a failure cause analysis device for analyzing the cause of the product (system) failure.

The failure cause analysis device is configured to generate the fault tree information indicating the result of analyzing the cause of the product (system) failure. Specifically, the causal relationship DB 114 functions as a causality related storage section for storing the information indicating the result of analyzing the cause of failure in the system (product) as an analysis target, that is, the information indicating the cause-and-effect sequence of failure in the multiple components at least constituting the analysis target in association with the component connection relationship. The component connection information input section 109 serves to input the component connection information indicating the connection relationship of group of components belonging to those constituting the analysis target. Based on the component configuration information on multiple components constituting the analysis target, and the component connection information indicating the respective connection relationships among the multiple components, the system level fault tree generation section 110 generates the information indicating the result of analyzing the failure cause intrinsic to the component, that is, the information on the first element indicating the relationship between the component and phenomenon occurred therein for each of the components. Based on the generated information on the first element, the system level fault tree information indicating the causal relationship of inter-component failure cause is generated.

Based on the component configuration information and the component connection information, the device/component level fault tree generation section 111 implements the function by searching the causality related storage section to generate the information relating to multiple phenomena linked to one of the first elements of the system level fault tree, that is, two or more pieces of second element information relating to the phenomena occurred in the respective components. Based on the generated second element information, the device/component level fault information is generated for indicating the causal relationship of inter-component failure cause in the layered structure. The filtering section 112 implements the function by comparing the device/component level fault tree information generated by the device/component level fault tree generation section 111 and the component configuration information relating to the components constituting the analysis target, and executing the filtering process to remove the element containing the component other than those constituting the analysis target from the device/component level fault tree information. The fault tree output section 113 implements the function by outputting the information after the filtering process executed by the filtering section to the output device 106. Other structures are similar to those of the first or the second embodiment.

If the DB is provided as the component information storage section for storing the information acquired from the 2D drawing or 3D model, that is, the component configuration information and the component connection information, the component connection information input section 109 implements the function as the component connection information input section by searching the component information storage in response to the user's operation, inputting the component configuration information and the component connection information, and transferring the input component configuration information and the component connection information to at least one of the system level fault tree generation section 110 and the device/component level fault tree generation section 111. Assuming that the fault tree output section 113 takes the information before filtering process executed by the filtering section 112 therefrom so that the information is output to the output device 106, the output device 106 is allowed to display the information before filtering process executed by the filtering section 112, that is, the device/component level fault tree information generated by the device/component level fault tree generation section 111 in the display mode different from the mode for displaying the information after filtering process, which has been output from the fault tree output section 113.

This embodiment allows accurate generation and display of the fault tree constituted by multiple elements indicating the analysis result of the failure cause without using the MFM information.

The present invention includes various modifications without being limited to the above-described embodiments. For example, the embodiments have been described in detail for readily understanding of the present invention, which are not necessarily limited to the one equipped with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

LIST OF REFERENCE SIGNS

101: fault tree generation device,
102: information terminal,
103: network,
104: central control unit,
105: input device,
106: output device,
107: main storage,
108: auxiliary storage,
109: component connection information input section,
110: system level fault tree generation section,
111: device/component level fault tree generation section,
112: filtering section,
113: fault tree output section

The invention claimed is:

1. A fault tree generation device, comprising:
a causal relationship storage section configured to store information indicating failure of an analysis target, the information indicating a chain of cause and effect of the failure in components belonging to multiple components at least constituting the analysis target in association with each component connection relationship;
a system level fault tree generation section configured to generate information indicating turbulence which has occurred in information transmission between the components, the information on a first element indicating a relationship between each component and a phenomenon occurred therein for each of the components based on component configuration information on the multiple components constituting the analysis target, and component connection information indicating each connection relationship among the multiple components, and to generate information on a system level fault tree indicating each failure causal relationship between the components based on the generated information on the first element; and a device/component level fault tree generation section configured to search the causal relationship storage section based on the component configuration information and the component connection information, generate information relating to multiple phenomena linked to one of the first elements of the system level fault tree, and two or more pieces of information on a second element indicating a relationship between the component and a phenomenon occurred therein, and generate information on the device/component level fault tree for showing the failure causal relationship between the components in a layered structure based on the generated information on each of the second element.

2. The fault tree generation device according to claim 1, further comprising a filtering section configured to compare the information on the device/component level fault tree generated by the device/component level fault tree generation section and the component configuration information, and execute a filtering process for removing the second element which includes a component except constituent components specified by the component configuration information from the information on the device/component level fault tree.

3. The fault tree generation device according to claim 1, further comprising:
 a component information storage section configured to store the component configuration information and the component connection information; and
 a component connection information input section configured to search the component information storage section in response to an operation, input the component configuration information and the component connection information, and transfer the component configuration information and the component connection information, which have been input to at least one of the system level fault tree generation section and the device/component level fault tree generation section.

4. The fault tree generation device according to claim 2, further comprising:
 a fault tree output section configured to output at least information after the filtering process, which has been taken from the filtering section; and
 an output device configured to display the information after the filtering process, which has been output from the fault tree output section.

5. The fault tree generation device according to claim 4, wherein:
 the fault tree output section outputs the information before the filtering process, which has been taken from the filtering section to the output device; and
 the output device displays the information before the filtering process executed by the filtering section, the information on the device/component level fault tree being generated by the device/component level fault tree generation section in a display mode different from a format for displaying the information after the filtering process, which has been output from the fault tree output section.

6. A fault tree generation method, comprising:
 a storage step of storing information indicating failure of an analysis target, the information indicating a chain of cause and effect of the failure in components belonging to multiple components at least constituting the analysis target in a causal relationship storage section in association with each component connection relationship;

a system level fault tree generation step of generating information indicating turbulence which has occurred in information transmission between the components, the information on a first element indicating a relationship between each component and a phenomenon occurred therein for each of the components based on component configuration information on the multiple components constituting the analysis target, and component connection information indicating each connection relationship among the multiple components, and generating information on a system level fault tree indicating each failure causal relationship between the components based on the generated information on the first element; and a device/component level fault tree generation step of searching the causal relationship storage section based on the component configuration information and the component connection information, generating information relating to multiple phenomena linked to one of the first elements of the system level fault tree, and two or more pieces of information on a second element indicating a relationship between the component and a phenomenon occurred therein, and generating information on the device/component level fault tree for showing the failure causal relationship between the components in a layered structure based on the generated information on each of the second element.

7. The fault tree generation method according to claim 6, further comprising a filtering step of comparing the information on the device/component level fault tree generated by the device/component level fault tree generation section and the component configuration information, and executing a filtering process for removing the second element which includes a component except constituent components specified by the component configuration information from the information on the device/component level fault tree.

8. The fault tree generation method according to claim 6, further comprising:
 a component information storage step of storing the component configuration information and the component connection information; and
 a component connection information input step of searching the component information storage section in response to an operation, inputting the component configuration information and the component connection information, and processing the component configuration information and the component connection information, which have been input into information to be used in at least one of the system level fault tree generation step and the device/component level fault tree generation step.

9. The fault tree generation method according to claim 7, further comprising:
 a fault tree output step of taking and outputting information at least after the filtering process executed in the filtering step; and
 an information display step of displaying the information after the filtering process, which has been output from the fault tree output step.

10. The fault tree generation method according to claim 9, wherein:
- the fault tree output step is executed for taking the information on the device/component level fault tree generated in the device/component level fault tree generation step as the information before the filtering process, and outputting the information to be used in the information display step; and
- the information display step is executed for displaying the information before the filtering process, the information on the device/component level fault tree being generated in the device/component level fault tree generation step in a display mode different from a format for displaying the information after the filtering process, which has been output in the fault tree output step.

* * * * *